US006981834B1

(12) United States Patent
Henry

(10) Patent No.: US 6,981,834 B1

(45) Date of Patent: Jan. 3, 2006

(54) PORTABLE ENGINE HOIST

(76) Inventor: James Louis Henry, 6224 Arazi La., North Las Vegas, NV (US) 89031

(*) Notice: Subject to any disclaimer, the term of this patent is extended or adjusted under 35 U.S.C. 154(b) by 120 days.

(21) Appl. No.: 10/447,571

(22) Filed: May 30, 2003

(51) Int. Cl.
*B60P 9/00* (2006.01)

(52) U.S. Cl. ....................... 414/462; 414/543; 212/299

(58) Field of Classification Search ................ 414/543, 414/400, 462; 224/403; 212/299, 294, 295
See application file for complete search history.

(56) References Cited

U.S. PATENT DOCUMENTS

| | | | | |
|---|---|---|---|---|
| 4,067,471 | A | 1/1978 | Roatcap | |
| 4,881,864 | A | 11/1989 | Amato | |
| 5,211,526 | A | 5/1993 | Robinette | |
| 5,314,202 | A | 5/1994 | Wilkins, Jr. | |
| 5,431,526 | A * | 7/1995 | Peterson et al. | 414/543 |
| 5,445,487 | A * | 8/1995 | Koscinski, Jr. | 414/543 |
| 5,540,537 | A | 7/1996 | Welch | |
| 6,065,621 | A * | 5/2000 | Fatemi et al. | 212/301 |
| D429,051 | S | 8/2000 | Porter | |
| 6,152,675 | A | 11/2000 | Compton | |
| 6,250,483 | B1 * | 6/2001 | Frommer | 414/462 |
| 6,478,528 | B1 * | 11/2002 | Asbury | 414/550 |
| 6,499,610 | B2 * | 12/2002 | Spitsbergen | 212/179 |
| 6,578,722 | B2 * | 6/2003 | Perkins et al. | 414/462 |
| 6,830,423 | B1 * | 12/2004 | Williams et al. | 414/462 |

* cited by examiner

*Primary Examiner*—James R. Bidwell

(57) ABSTRACT

A hoist includes is removably attachable to a vehicle hitch and includes a connector member and a first locking plate for adjustably connecting a base member to the connector member. The locking plate allows the connector portion to be selectively rotated in a first plane. The hoist further includes a boom pivotally connected to the connector member for allowing the boom to be pivoted in a second plane substantially perpendicular to the first plane. The hoist further includes a winch for pivoting the boom along the second plane. Alternately, a piston may pivot the boom along the second plane. A lifting member is removably connectable to the boom and for transporting an object from a first location to a second location. In an alternate embodiment, the hoist may include a manually or hydraulically operated winch for controlling the lifting member.

3 Claims, 6 Drawing Sheets

PORTABLE ENGINE HOIST

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to an engine hoist and, more particularly, to an engine hoist that is removably attachable to a trailer hitch and includes alternate lifting means.

2. Prior Art

The ability to use vehicles as a means for hauling objects as well as a means for transportation has always been a public concern. Consequently, various devices which mount to the rear of a vehicle to serve as a lift have been invented. One such device is disclosed in U.S. Pat. No. 2,867,402 issued on Jan. 6, 1959, to Graybill et al. Graybill et al. disclose an angled post with hooks at an upper end and a bumper clamp at the opposite end. The bumper clamp facilitates the mounting of the shaft to the rear bumper of a vehicle, while the hooks permit objects to be suspended for transportation by the vehicle.

U.S. Pat. No. 4,806,063 issued on Feb. 21, 1989, to York discloses a hoist which mounts to a ball trailer hitch. The hoist includes a multiple section boom which is provided with a winch. Straps attached to either side of a vehicle and a torsion bar mounted to the rear of the vehicle support the boom on the ball trailer hitch. The winch cable connects to a hanger which is used to support objects for transportation by the vehicle.

U.S. Pat. No. 5,064,078 issued on Nov. 12, 1991, to Van Staveren discloses a vehicle mounted crane. The crane includes a hydraulic cylinder to raise and lower its boom, and, further, mounts to a modified vehicle bumper using a specially designed support assembly. The distal end of the boom includes a chain which may connect to a variety of carrying devices such as a hook or an axle attachment-towing device.

U.S. Pat. No. 4,881,864 issued Nov. 21, 1989, to Amato discloses a hoist which attaches to a trailer hitch drawbar of a vehicle. The hoist includes a post connected to a tongue which fits within the trailer hitch drawbar to support the post. The lower end of the post includes an adjustable foot which aids in supporting the post. The post includes a boom which supports a cable driven by a winch attached to the post. The cable connects to a hook which is utilized to connect the cable to objects for hauling using the vehicle.

U.S. Pat. No. 5,211,526 issued on May 18, 1993, to Robinette discloses a mobile crane. The crane includes a central column which connects at a lower end to a T-shaped support and at its upper end to a boom. The T-shaped support fits within a trailer hitch drawbar to secure the crane to the rear of a vehicle. The crane further includes a hydraulic cylinder which vertically manipulates the boom.

Although the above-described devices operate adequately to lift objects for hauling, they each suffer from the disadvantage of difficult installation. For example, U.S. Pat. No. 2,867,402 uses a complicated clamping system to attach its post to the bumper of a vehicle, while U.S. Pat. No. 5,064,078 requires both a modified bumper and specially designed support assembly to mount its crane. Furthermore, both U.S. Pat. Nos. 4,806,063 and 5,211,526 require complicated and time-consuming assembly. Finally, U.S. Pat. No. 4,881,864 is difficult to mount into a trailer hitch drawbar because it is a single unit requiring strenuous exertion to be lifted and placed within the trailer hitch drawbar.

Accordingly, a hoist that requires little assembly and is extremely simple to mount to the rear of a vehicle is highly desirable.

BRIEF SUMMARY OF THE INVENTION

In view of the foregoing background, it is therefore an object of the present invention to provide a portable engine hoist for automotive mechanics to lift and retrieve heavy engines from vehicles in remote locations, such as junkyards or locations where traditional engine-hoisting devices cannot be operated. These and other objects, features, and advantages of the invention are provided by a hoist including a base member having a substantially horizontal portion and a substantially vertical portion integral therewith. The horizontal portion is removably insertable into a vehicle hitch and has an aperture formed therein for receiving a first locking pin so that the base member will be securely connected to a vehicle hitch.

The hoist further includes a connector member having lower and upper end portions and a first locking plate for adjustably connecting the vertical portion of the base member to the lower end thereof. The locking plate allows the connector portion to be selectively rotated in a first plane. The hoist further includes a boom having first and second end portions with the first end portion being pivotally connected to the upper end portion of the connector member and thereby allows the boom to be pivoted in a second plane substantially perpendicular to the first plane.

The hoist further includes means for pivoting the boom along the second plane that is connected to the connector member and to the first end portion of the boom. A lifting member is removably connectable to the second end portion of the boom for transporting an object from a first location to a second location. The boom preferably includes a first member having an aperture formed therein and connected to the connector member. A second member has a plurality of apertures formed therein and is alignable with the aperture of the first member so that a length of the boom can be telescopically adjusted by inserting a pin therethrough.

The means for pivoting the boom preferably includes a winch including an elongate cable having lower and upper end portions anchored to the winch and to the first end portion of the boom respectively. Advantageously, as the cable in wound, the boom is caused to pivot in a first direction along the second plane and, when the cable is unwound, the boom is caused to pivot in a second direction along the second plane. The means for pivoting the boom may include a power supply source attached to the winch. The hoist may also include a control panel for operating the winch via the power supply source.

Alternately, the means for pivoting the boom may include a sump attached to the connector member and for selectively supplying either fluid or air to an elongate hose connected to the sump. A piston is connected to the hose and is selectively operable by the sump. The piston preferably includes a stationary portion secured to the connector member and a mobile portion having opposed end portions connected to the stationary portion and the boom respectively. The hoist may further includes a power supply source connected to the piston and a control panel for operating same:

The hoist may further include means for operating the lifting member that is connected to the boom. The means for operating the lifting member preferably includes a winch including an elongate cable having opposed end portions anchored thereto and to the second end portion of the boom respectively. A plurality of sheaves cooperate with the winch and are disposed adjacent to the second end portion of the boom for guiding the cable towards the lifting member. Alternately, the means for operating the lifting member may include a power supply source for powering the winch and a control panel for operating same.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout, and prime and double prime notations are used to indicate similar elements in alternate embodiments.

Figure 1:
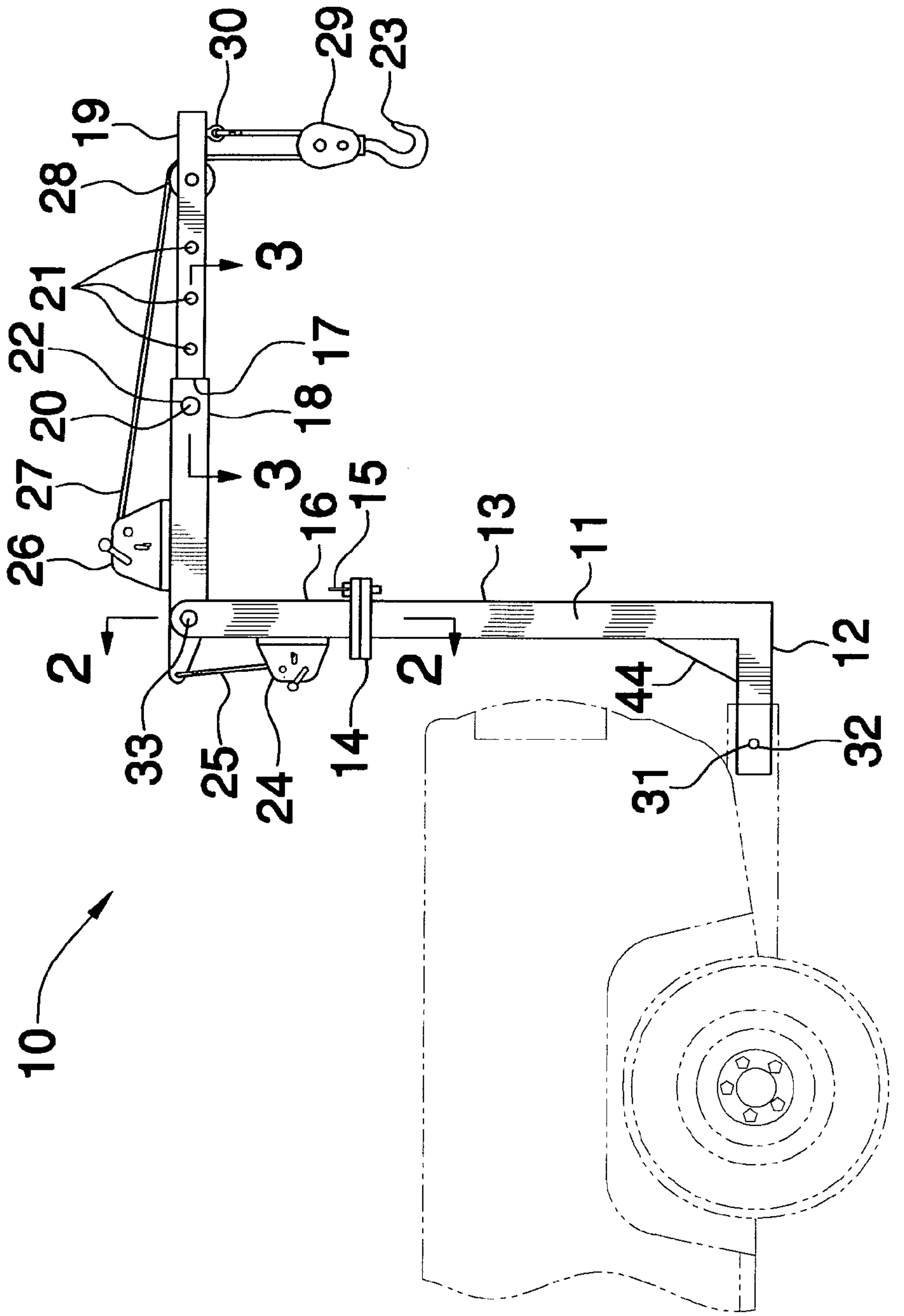
FIG. 1 is a side elevational view showing a portable engine hoist including means for operating the hoist via a hand-operated winch, in accordance with the present invention.

The hoist of this invention is referred to generally in FIG. 1 by the reference numeral 10 and is intended to be removably attachable to a vehicle hitch or drawbar for transporting an engine in a relatively simple manner. It should be understood that the hoist 10 may be used to transport other heavy objects and should not be limited to transporting only engines.

The hoist 10 includes base member 11 having a substantially horizontal portion 12 integral with a substantially vertical portion 13. The horizontal portion 12 has an end portion provided with an aperture 31 therein and insertable into a conventional vehicle hitch such as a class III or IV trailer hitch, for example. The base member 11 is securely maintained and attached to a conventional trailer hitch by inserting a locking pin 32 into aperture 31. A bracket 44 is connected to base member 11, where the vertical portion 13 and horizontal portion 12 form a substantially right angle, to thereby assist in preventing the base member 11 from bending thereat.

The hoist 10 further includes a connector member 16 having a lower end portion rotatably connected to the vertical portion 13 of base member 11. In particular, a locking plate 14 secures such members together and maintains same at a stationary position by inserting a locking pin 15 through aperture 35. The connector member 16 further has an upper end portion that is generally annular and is connected to the first end portion of boom 17. Boom 17 includes a first member 18 having a hollow or tubular portion and further includes a second member 19 removably positionable within such a hollow portion.

In particular, the first member 18 is provided with aperture 20 formed at an end portion thereof adjacent to the second member 19. The second member 19 is provided with a plurality of generally equally spaced apertures 21 extending along the length thereof. Such apertures 21 are alignable with aperture 20 of first member 18 for allowing the boom 17 to be secured and telescopically adjusted in length by selectively positioning pin 22 into corresponding apertures 20, 21.

The lifting member 23 is hook shaped and is operably connected to the second end portion of boom 17. Of course, such a lifting member 23 may be shaped as a clamp or other conventional devices, well known in the industry. A fastener 30 is secured to the second end portion of boom 17 and anchors an end portion of cable 27 attached thereto. Such a cable is guided by a plurality of pulley or sheaves 28, 29 disposed adjacent to second member 19 of boom 17. In particular, pulley 29 is connected to lifting member 23 while pulley 28 is secured to second member 19 to thereby guides cable 27 from winch 26, connected to the first member 18 of boom 17, towards pulley 29.

Winch 26 is preferably a conventional and manually operated device and includes a drum (not shown) for receiving cable 27 therearound, as well known to person of ordinary skill in the art. Similarly, winch 24 is connected to connector member 16 and is a conventional and manually operated device including a drum for receiving cable 25 therearound. Cable 25 extends from winch 24 and is secured to the first end portion of boom 17. Such winches 24, 26 are operated by rotating their respective handles to thereby cause their respective cables 25, 27 to be extended or retracted. Advantageously, boom 17 can be pivoted about rod 33 substantially along a distinct plane. Likewise, lifting member 23 may be moved from a low position to a high position.

Figure 2:
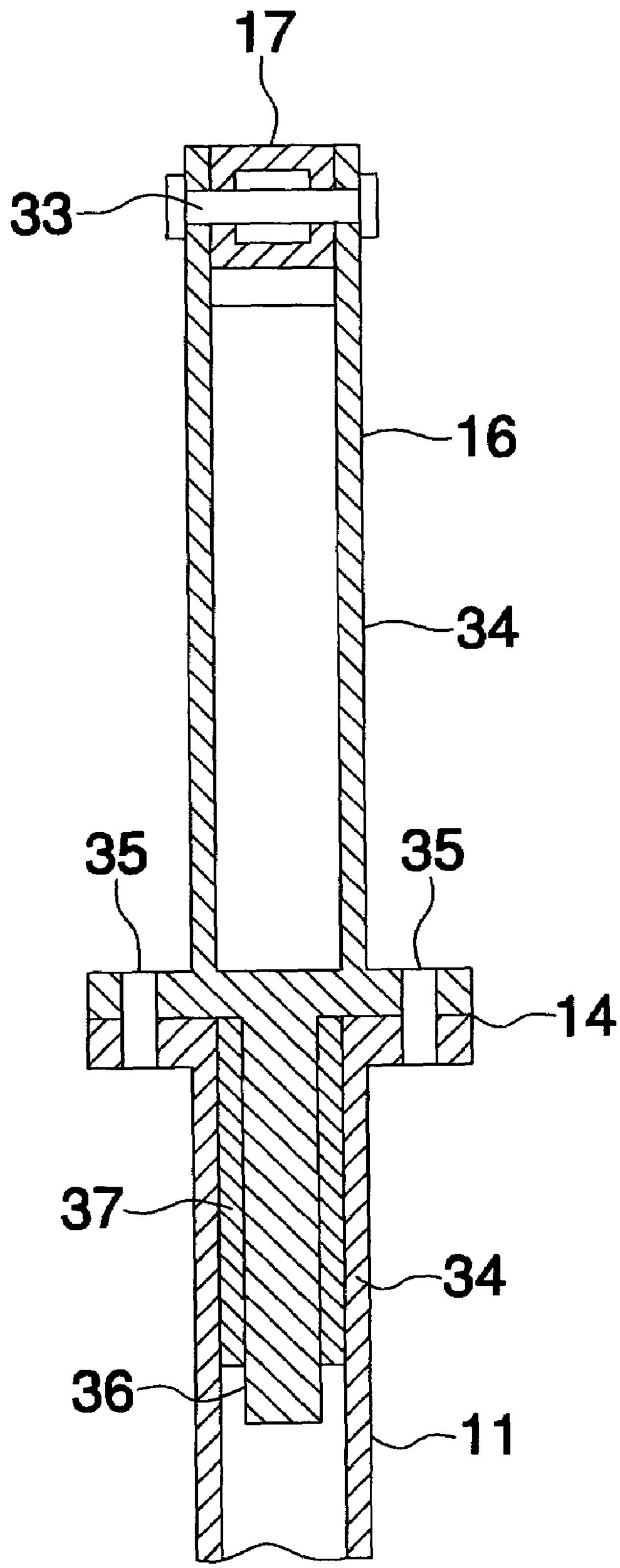
FIG. 2 is an enlarged cross-sectional view taken along line 2—2 in FIG. 1.

Now referring to FIG. 2, a cross-section of connecting member 16 and base member 11 is shown wherein the connector member 16 has a lower end portion 36, which is rounded and is surrounded by round tubing 37, both disposed within the hollow interior of base member 11. In particular, such a base member preferably includes a square tubing 34 to thereby allow connector member 16 to rotatably move about a longitudinal axis of base member 11. Of course, locking pin 15 must be removed from locking plate 14 when desiring to rotate the connector member 16. Such a locking pin must be reinserted into aperture 35 for maintaining the connector member 16 at a stationary position.

Figure 3:
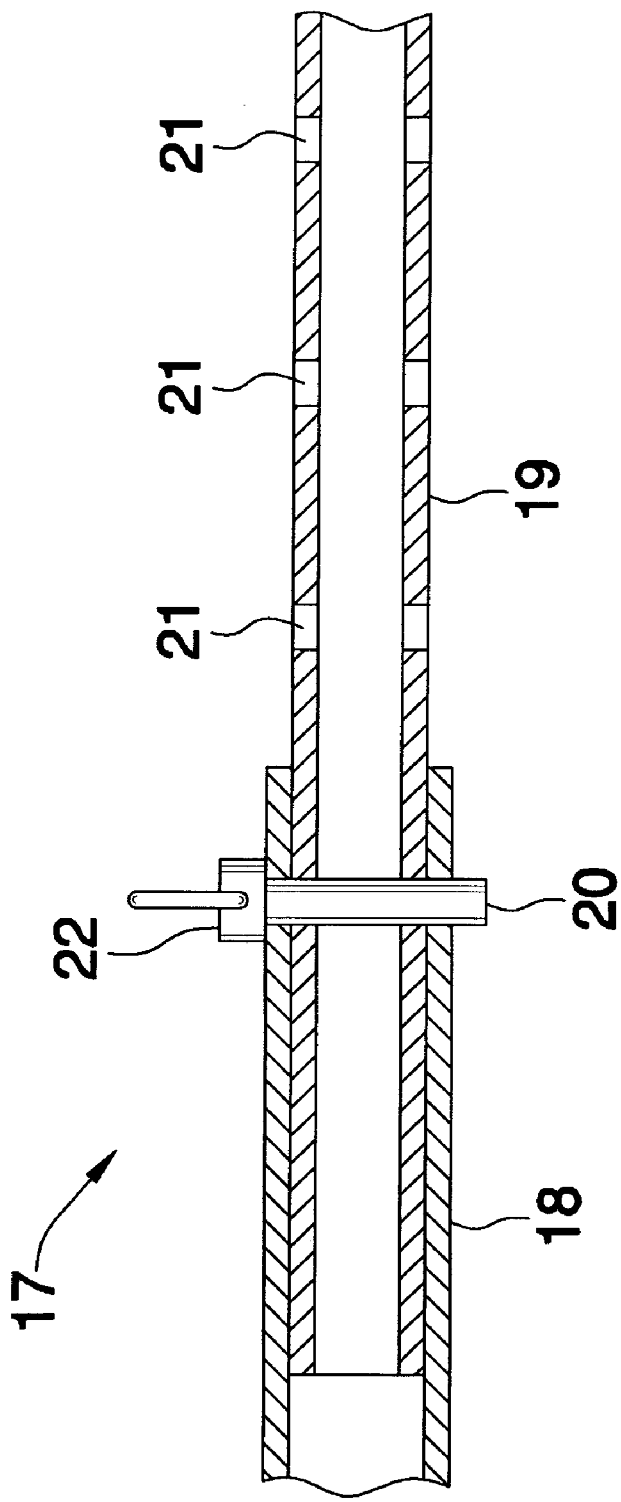
FIG. 3 is an enlarged cross-sectional view taken along line 3—3 in FIG. 1.

Now referring to FIG. 3, a cross-sectional view of boom 17 is shown wherein the second member 18 telescopically receives first member 19 therein so that the length of boom 17 can be adjusted in a substantially linear direction. Locking pin 22 passes through aperture 20 of first member 18 and an associated aperture 21 of second member 19. The first member 18 may have a substantially square tubular cavity for assisting the second member 19 to slidably move therein.

Figure 4:
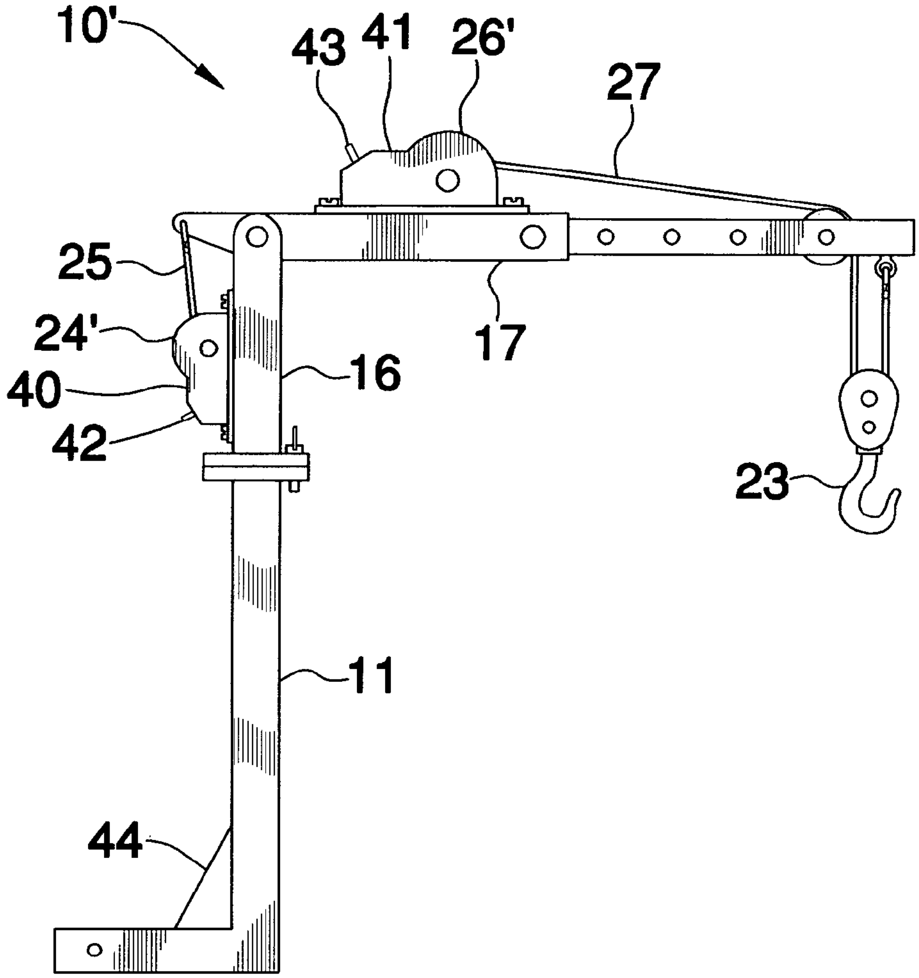
FIG. 4 is an alternate embodiment of FIG. 1 including means for operating the hoist via an power operated winch.

Now referring to FIG. 4, an alternate embodiment 10' of the present invention is shown wherein winches 24', 26' are not manually operated. Rather, they are automatically operated in a conventional manner. In particular, winch 24' includes a power source 40 connected thereto and operated by a control panel 42. Similarly, winch 26' includes a power source 41 connected thereto and operated by a control panel 43. Advantageously, an operator does not have to manually turn the handle of winches 24, 26 to operate hoist 10'. Power sources 40, 41 may be conventional power sources such as battery packs or may include power cords (not shown) connectable to power outlets (not shown), as would be obvious to person of ordinary skill in the art.

Figure 5:
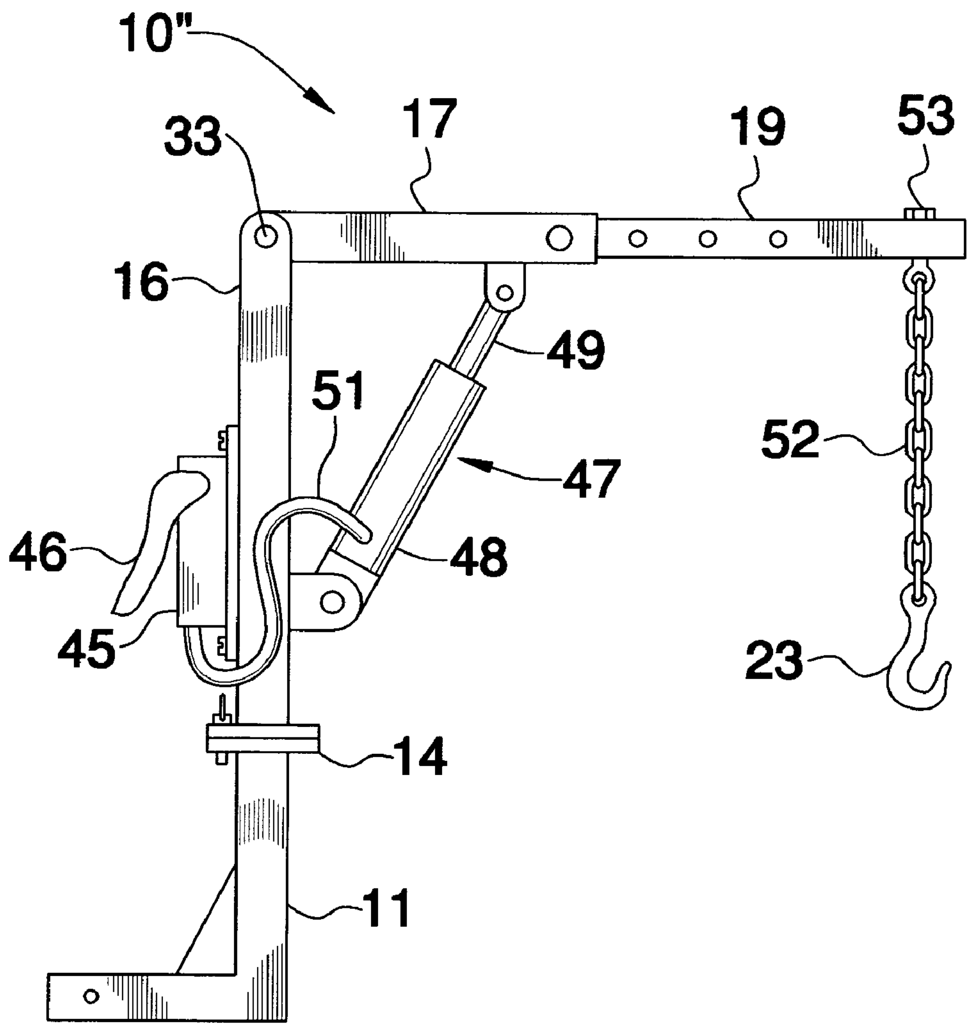
FIG. 5 is an alternate embodiment of FIG. 1 including means for operating the hoist via a hand-operated piston.

Now referring to FIG. 5, an alternate embodiment 10" is shown wherein boom 17 is pivotable by a conventional piston 47 such as a hydraulic piston, for example. A conventional sump 45 is connected to connecting member 16 via a bracket and includes a pump handle 46 for supplying fluid or other conventional material to the hydraulic piston 47 via hose 51. Hydraulic piston 47 includes a stationary portion 48 connected to the connecting member 16 via a conventional bracket and further includes a movable portion 49 connected to boom 17 via a conventional bracket. As well known in the industry, the movable portion 49 extends substantially parallel to a longitudinal axis passing therethrough and thereby pivots boom 17 about rod 33. Lifting member 23 is securely attached to chain 52, which is anchored to second member 19 via a conventional fastener 53.

Figure 6:
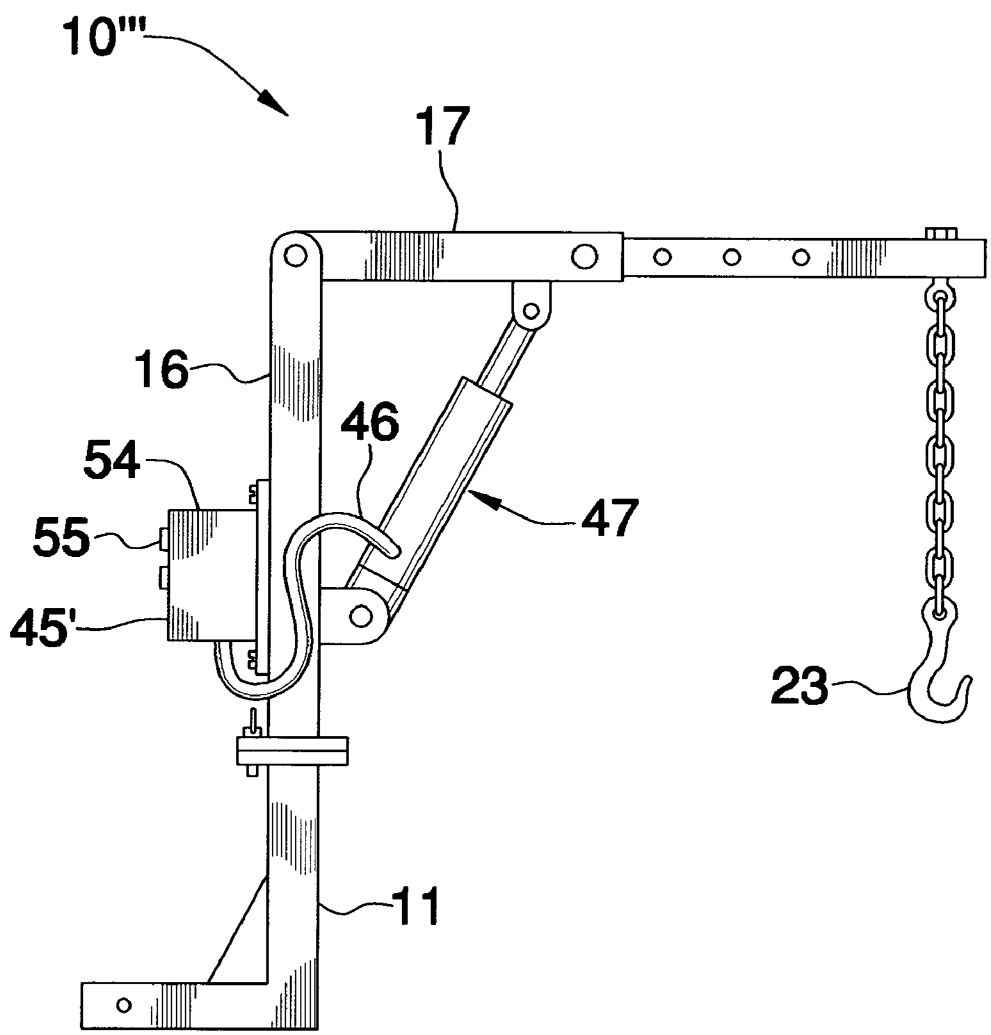
FIG. 6 is an alternate embodiment of FIG. 1 including means for operating the hoist via a power operated piston.

Now referring to FIG. 6, an alternate embodiment 10'" of the present invention is shown wherein the hydraulic piston 47 is power operated by a conventional control panel 55 connected to sump 45. A power source 54 supplies power to sump 45, in a manner well known in industry. Advantageously, an operator may easily and quickly operate the hoist 10'" without exerting unnecessary effort.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A hoist comprising:

a base member having a substantially horizontal portion and a substantially vertical portion monolithically formed therewith, said horizontal portion being directly conjoined with no intervening elements to a vehicle hitch and having an aperture formed therein for receiving a first locking pin so that said base member will be securely connected to a vehicle hitch;

a support bracket directly conjoined to said horizontal portion and said vertical portion;

a connector member having lower and upper end portions and a first locking plate for adjustably connecting said vertical portion of said base member to the lower end thereof, said locking plate allowing said connector member to be selectively rotated in a first plane;

a boom having first and second end portions with the first end portion being pivotally connected to the upper end portion of said connector member and for allowing said boom to be pivoted in a second plane substantially perpendicular to said first plane, said first end portion extending rearward of said connector member, said boom comprising a first member having an aperture formed therein and being connected to said connector member, and a second member having a plurality of apertures formed therein and being alignable with the aperture of said first member so that a length of said boom can be telescopically adjusted by inserting a locking pin through a corresponding pair of the apertures;

means for pivoting said boom along the second plane and being connected to said connector member and to said first end portion of said boom;

wherein said means for pivoting said boom comprises a winch directly conjoined to a rear face of said connector member and including an elongate cable having lower and upper end portions anchored to said winch and anchored at a static position directly subjacent to said first end portion of said boom respectively so that as said cable is wound said boom is caused to pivot in a first direction along the second plane and when said cable is unwound said boom is caused to pivot in a second direction along the second plane;

a lifting member removably connectable to the second end portion of said boom and for transporting an object from a first location to a second location; and means for operating said lifting member and being directly connected to said boom;

wherein said means for operating said lifting member comprises a winch directly conjoined to an upper face of said first member and including an elongate cable including opposed end portions anchored thereto and statically anchored to said second end portion of said boom respectively;

a plurality of sheaves cooperating with said winch and being disposed adjacent to the second end portion of said boom for guiding said cable towards said lifting member; and a fastener directly conjoined to a bottom surface of said second end portion of said boom such that said cable extends downwardly from one said sheaves and upwardly about another said sheaves so that said cable becomes statically anchored to said fastener, said one sheave being directly conjoined to said second member of said boom, said another sheave being spaced below said second member of said boom and directly connected to said lifting member.

2. The hoist of claim 1, wherein said means for pivoting said boom comprises:

a power supply source; and a winch powered by said power supply source and including a control panel for operating same.

3. The hoist of claim 1, wherein said means for operating said lifting member comprises:

a power supply source; and a winch powered by said power supply source and including a control panel for operating same.

* * * * *